(12) United States Patent
Patel et al.

(10) Patent No.: US 8,487,498 B2
(45) Date of Patent: Jul. 16, 2013

(54) MULTIPLE CONDUCTOR WINDING IN STATOR

(75) Inventors: Dhaval Patel, Loves Park, IL (US); Derek R. Hochstetler, Loves Park, IL (US); Gordon W. Friske, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 159 days.

(21) Appl. No.: 12/847,104

(22) Filed: Jul. 30, 2010

(65) Prior Publication Data
US 2012/0025660 A1    Feb. 2, 2012

(51) Int. Cl.
*H02K 3/28* (2006.01)
*H02K 3/34* (2006.01)

(52) U.S. Cl.
USPC ............................ 310/184; 310/208; 310/215

(58) Field of Classification Search
USPC .......................................... 310/184, 208, 215
See application file for complete search history.

(56) References Cited

U.S. PATENT DOCUMENTS

| | | | |
|---|---|---|---|
| 2,407,935 A * | 9/1946 | Perfetti et al. | 310/201 |
| 6,091,168 A | 7/2000 | Halsey et al. | |
| 6,246,141 B1 | 6/2001 | Bailey | |
| 6,492,757 B2 * | 12/2002 | Nakamura et al. | 310/180 |
| 6,915,556 B2 * | 7/2005 | Lenoir et al. | 29/596 |
| 6,943,477 B1 * | 9/2005 | Nakamura | 310/184 |
| 6,990,724 B2 * | 1/2006 | Tamura et al. | 29/596 |
| 7,005,773 B2 * | 2/2006 | Nakamura | 310/180 |
| 7,038,346 B2 * | 5/2006 | Koike | 310/184 |
| 7,262,537 B2 | 8/2007 | Worley et al. | |
| 7,268,455 B2 * | 9/2007 | Kouda et al. | 310/184 |
| 7,348,705 B2 | 3/2008 | Cai et al. | |
| 7,439,715 B2 | 10/2008 | Rozman et al. | |
| 2004/0187293 A1 | 9/2004 | Bradfield | |
| 2008/0093948 A1 | 4/2008 | Naganawa | |
| 2009/0100665 A1 * | 4/2009 | Berger et al. | 29/596 |
| 2009/0261683 A1 | 10/2009 | Sadiku et al. | |
| 2010/0013347 A1 | 1/2010 | Clark | |
| 2010/0026133 A1 | 2/2010 | Fubuki et al. | |

FOREIGN PATENT DOCUMENTS
JP    2001211584 A  *  8/2001

* cited by examiner

*Primary Examiner* — Burton Mullins
(74) *Attorney, Agent, or Firm* — Carlson, Gaskey & Olds, P.C.

(57) ABSTRACT

An electric machine includes a stator disposed about an axis in register with the rotor. The stator has a plurality of slots parallel to the axis. A plurality of windings with generally rectangular cross sections is provided with each winding having a first portion disposed radially inward of a second portion relative to the axis. At least two of the plurality of windings are at least partially inserted into each of the plurality of slots. The plurality of generally rectangular windings in each of the plurality of slots is configured to reduce resistive loss within the stator.

18 Claims, 7 Drawing Sheets

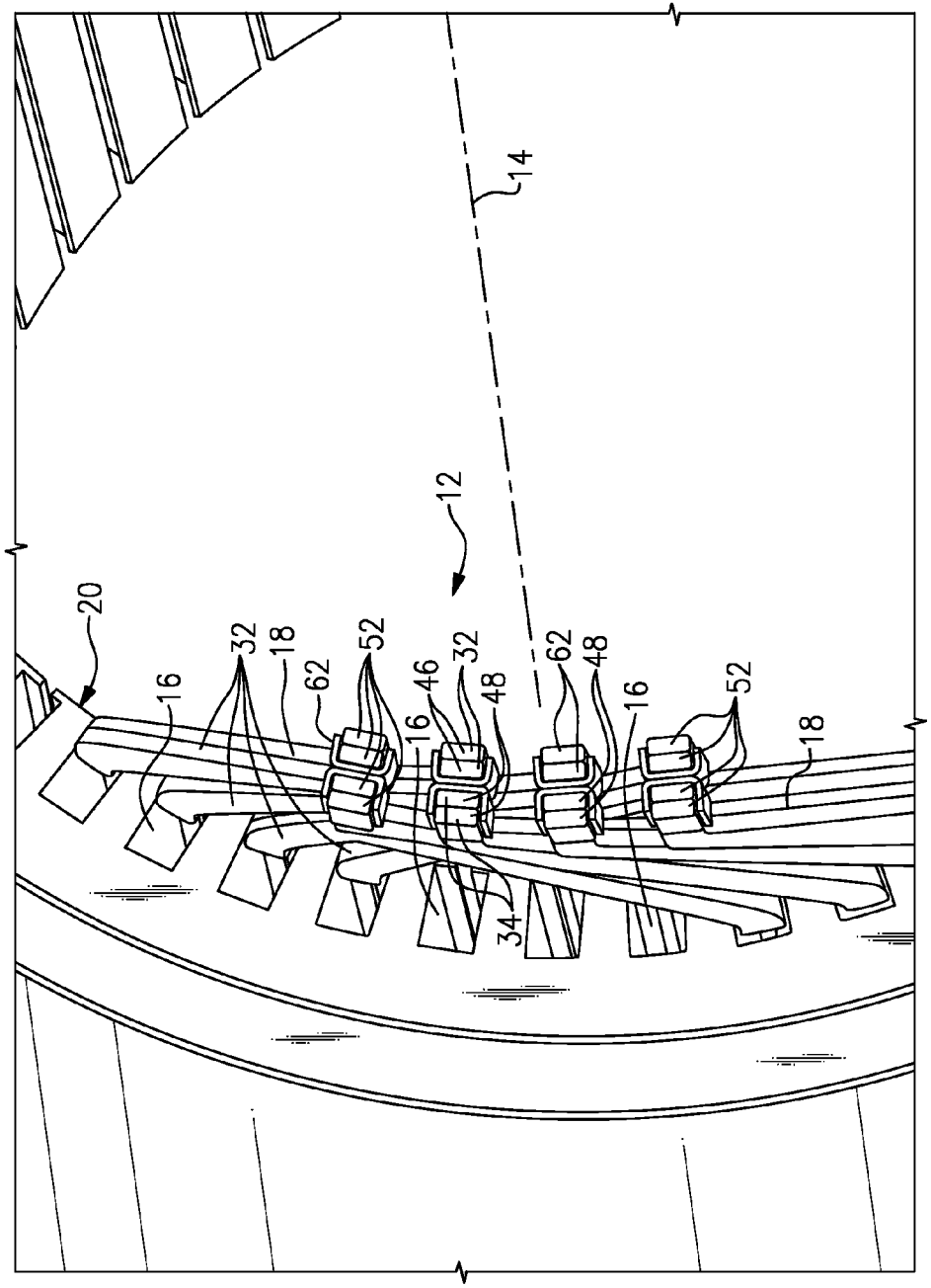

MULTIPLE CONDUCTOR WINDING IN STATOR

BACKGROUND

This disclosure relates generally to electric machines, including generators and motors having stators with electrical windings.

Electric machines, such as electric generators, are generally used to convert mechanical energy into electrical energy. Electric machines generally include a stator and a rotor in register therewith. The stator includes electrical windings that allow alternating current ("AC") to flow through the stator. Movement of the rotor relative to the stator causes an AC current to move through the windings. An electrical connection is provided between the windings and various components, such as a power bus, to allow electrical current to flow between the stator and the various components serving as loads.

As a result of the AC currents in the windings, the windings are subject to eddy losses. The eddy losses are caused by cross slot flux which is induced by the AC current in the winding. The cross slot flux flows through the winding and produces an eddy current on the winding conductor. As a result, the eddy current in the conductor increases the effective resistance of the conductor and resistive losses.

SUMMARY

An example electric machine includes a stator disposed about an axis in register with the rotor. The stator has a plurality of slots parallel to the axis. A plurality of windings with generally rectangular cross sections is provided with each winding having a first portion disposed radially inward of a second portion relative to the axis. At least two of the plurality of windings are at least partially inserted into each of the plurality of slots. The plurality of windings of each of the plurality of slots are aligned such that each first portion is in contact with at least one other first portion of the same slot forming an inner group relative to each of the plurality of slots and each second portion is in contact with at least one other second portion of the same slot forming an outer group relative to each of the plurality of slots. The inner group of each of the plurality of slots is connected to the outer group of another non-adjacent slot. The plurality of generally rectangular windings in each of the plurality of slots is configured to reduce resistive loss within the stator.

An example stator includes a plurality of slots and a plurality of windings. Each winding has a generally rectangular cross section and includes a first portion radially inward of a second portion. Each of the plurality of slots includes a pair of the plurality of windings at least partially inserted therein, wherein each first portion of the pair are contacting and form an inner group and each second portion of the pair are contacting and form an outer group. Each slot has an insulator including a first section surrounding the inner group and a second section surrounding the outer group. The plurality of windings within each of the plurality of slots is configured to reduce resistive loss within the stator. The stator also includes a plurality of clips. The inner group of each of the plurality of slots and the outer group of another non-adjacent slot are both in contact with one of the plurality of clips. The plurality of clips are configured to provide electrical connection between the inner group and the outer group.

An example housing assembly includes an input housing enclosing a stator disposed about an axis. The stator has a plurality of slots parallel to the axis. Each of a plurality of windings has a generally rectangular cross section, a first portion, and a second portion. The first portion is disposed radially inwardly of the second portion relative to the axis. At least two of the plurality of windings are at least partially disposed within each of the plurality of slots. The plurality of windings in each of the plurality of slots is aligned such that each first portion is in contact with at least one other first portion of the same slot and each second portion is in contact with at least one other second portion of the same slot. At least one first portion of each of the plurality of slots is connected to at least one second portion of another non-adjacent slot. The plurality of windings in each of the plurality of slots reduces resistive loss within the stator.

A method for reducing eddy current within a stator includes providing a stator with a plurality of slots. At least two windings with generally rectangular cross sections are inserted at least partially into each of the plurality of slots such that the windings are stacked down the longitudinal side of the slot. The windings are oriented such that they span the depth of the slot. The at least two rectangular windings are arranged such that all first portions of each winding at least partially in the same slot are in contact with each other at an end and all second portions of each winding at least partially in the same slot are in contact with each other at an end. The contacting first portions of each slot are aligned with the contacting second portions of another non-adjacent slot such that the aligned first portions and second portions are electrically connected.

These and other features can be best understood from the following specification and drawings, the following of which is a brief description.

BRIEF DESCRIPTION OF THE DRAWINGS

FIG. 8 is a perspective top view of the example stator of FIG. 2 including the winding portions not within a slot

DETAILED DESCRIPTION

Figure 1:
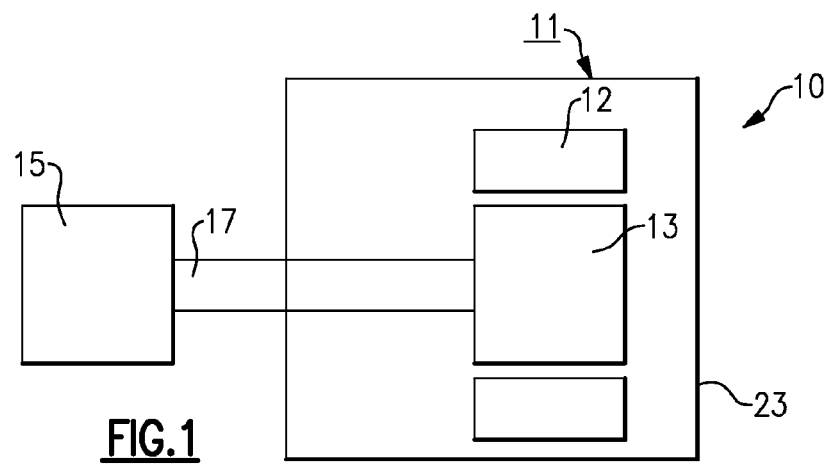
FIG. 1 is a schematic view of an example electric machine assembly.

Referring to FIG. 1, an example electric machine 10, such as an electric generator or auxiliary power unit, is shown schematically. As shown, the electric machine 10 includes a stator 12 in register with a rotor 13. However, it is within the contemplation of this disclosure to use any wound stator 12 and rotor 13 arrangements, as well as a electric machine 10 having more components, or different arrangements. The electric machine is driven by a prime mover 15, such as a gas turbine engine for aerospace application. As shown, a shaft 17 couples the prime mover 15 and the rotor 13. However, it is within the contemplation of this disclosure to use other prime movers and coupling arrangements. In one example, a housing assembly 11 includes an input housing 23 enclosing various components of the electric machine 10. However, it is within the contemplation of this disclosure for the housing assembly to include more components and different arrangements. In one example, the input housing 23 encloses the stator 12 and rotor 13. The shaft 17 extends into the input housing 23 to couple to the rotor 13. As shown, the input housing 23 encloses the stator 12 and rotor 13. However, it is within the contemplation of this disclosure for more components, such as thermal devices, to be enclosed in the input housing 23 and for the housing 23 to partially cover the electric machine 10.

Figure 2:
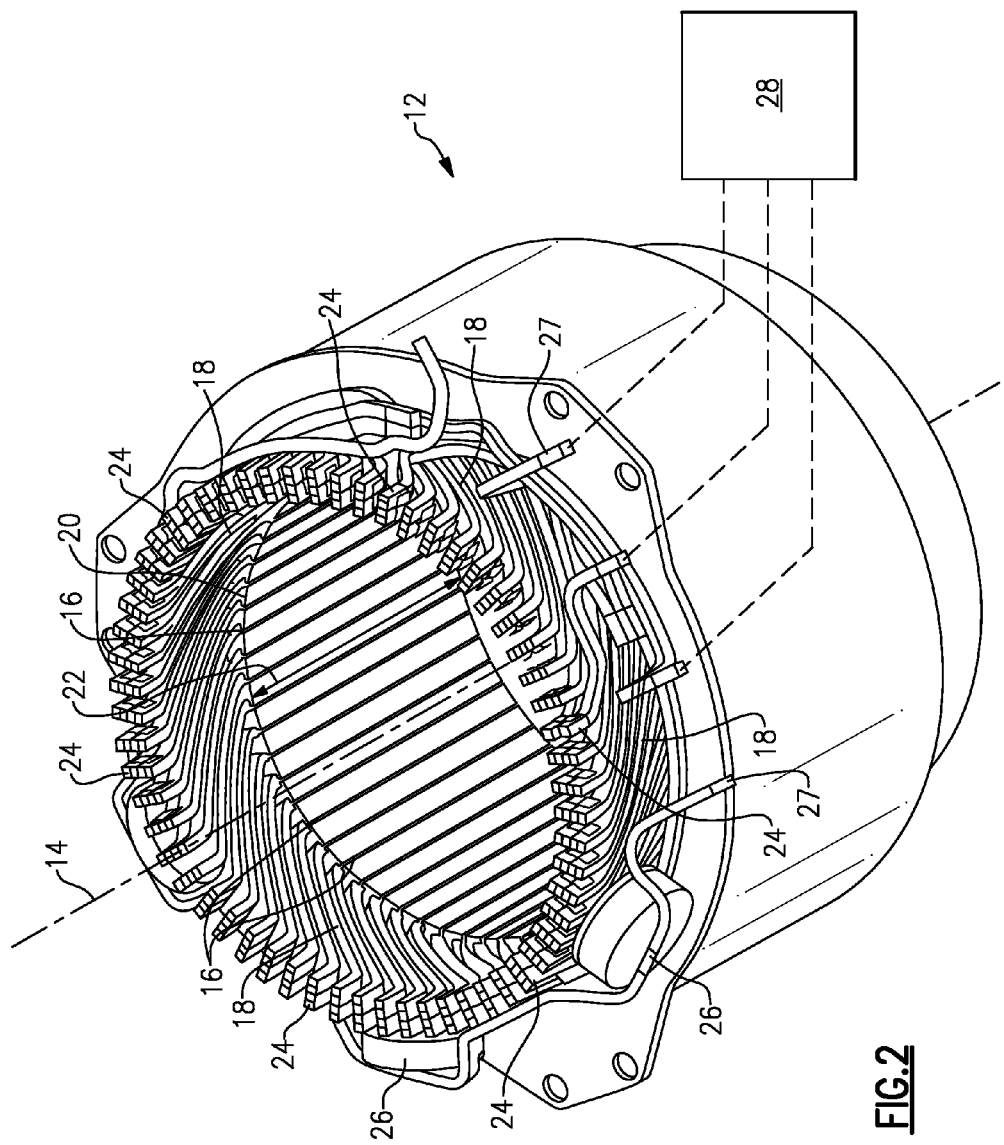
FIG. 2 is a perspective view of an example stator.

Referring to FIG. 2, an example stator 12 is disposed about an axis 14 and includes a plurality of slots 16 and a plurality of windings 18. Each of the plurality of windings 18 has a generally rectangular cross section, shown in greater detail in FIG. 7A. In one example, the plurality of windings 18 has a generally rectangular cross section while having rounded corners. At least a portion of each of the plurality of windings 18 extend into each of the plurality of slots 16. The plurality of slots 16 is located circumferentially around an inner circumference 20 of the stator 12. The plurality of slots 16 extend the length 22 of the stator 12, and is parallel to the axis 14. However, it is within the contemplation of this disclosure to use slots 16 of other lengths and orientations.

The stator 12 includes a number of jump connections 24 that are electrically connected with current transformers 26 and phase outlets 27 to provide an electrical connection between the stator 12 and another component or device 28. In one example, three pairs of jump connectors 24 are shown with each jump connector 24 of a pair 180 degrees apart. The pairs of jump connectors 24 may also be offset by 120 degrees, providing a three phase alternating current arrangement. However, it is within the contemplation of this disclosure to use other arrangements and numbers of jump connectors 24.

Figure 3A:
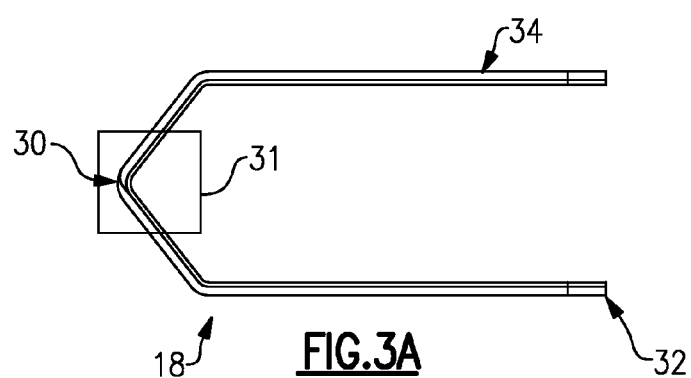
FIG. 3A is a perspective view of an example winding.
Figure 3B:
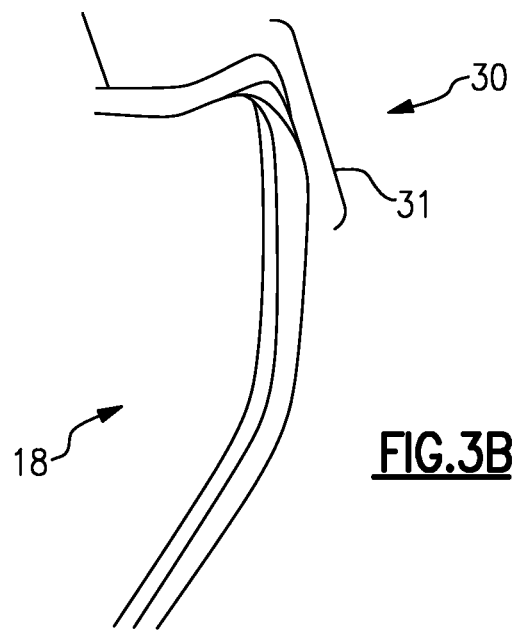
FIG. 3B is a close-up perspective view of the knuckle portion of the example winding of FIG. 3A.

Referring to FIGS. 3A and 3B, with continued reference to FIG. 2, an example winding 18 includes a knuckle 30, a first portion 32, and a second portion 34. The knuckle 30 is formed by performing a twist and bend of a portion 31 of the winding 18 to create an end to insert into a slot 16 of the stator. By creating the knuckle 30 through twisting and bending the winding 18, a separate first portion 32 and second portion 34 of the winding 18 are created. However, even though the winding 18 is twisted at the knuckle 30 to create an angle, allowing both the first portion 32 and second portion 34 to extend in the same direction, both the first portion 32 and second portion 34 maintain the generally rectangular cross-section. The winding 18 is made of electrically conductive material, such as copper or other similarly conductive material.

Figure 4:
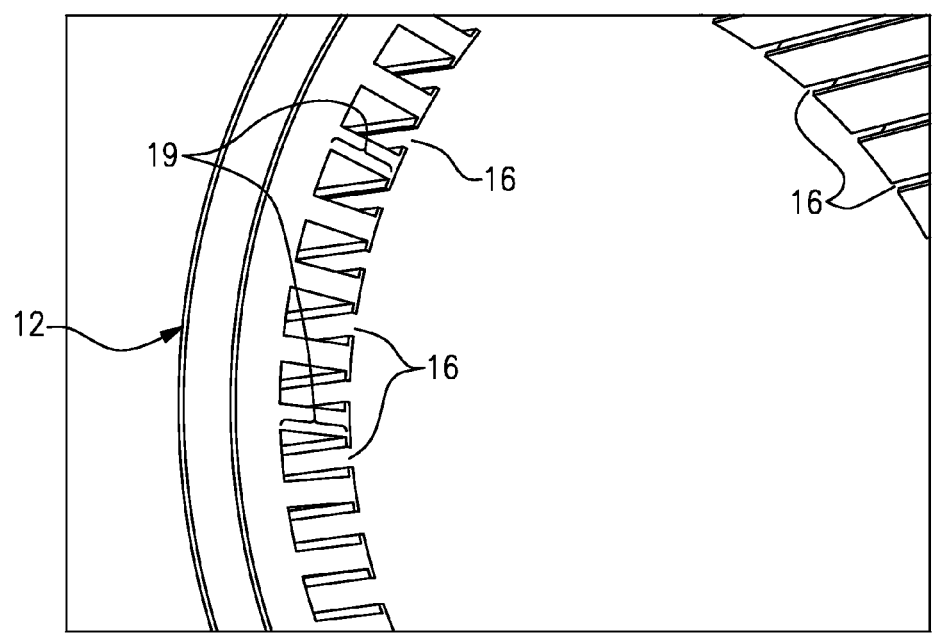
FIG. 4 is a perspective view of the plurality of slots of an example stator.

Referring to FIG. 4, with continued reference to FIG. 2, a portion of the stator 12 of FIG. 2 is shown with the plurality of windings 18 removed to better illustrate the plurality of slots 16. The plurality of slots 16 have a depth 19 and are shown for illustrative purposes to indicate placement and orientation of the plurality of slots 16 in the stator 12.

Figure 5:
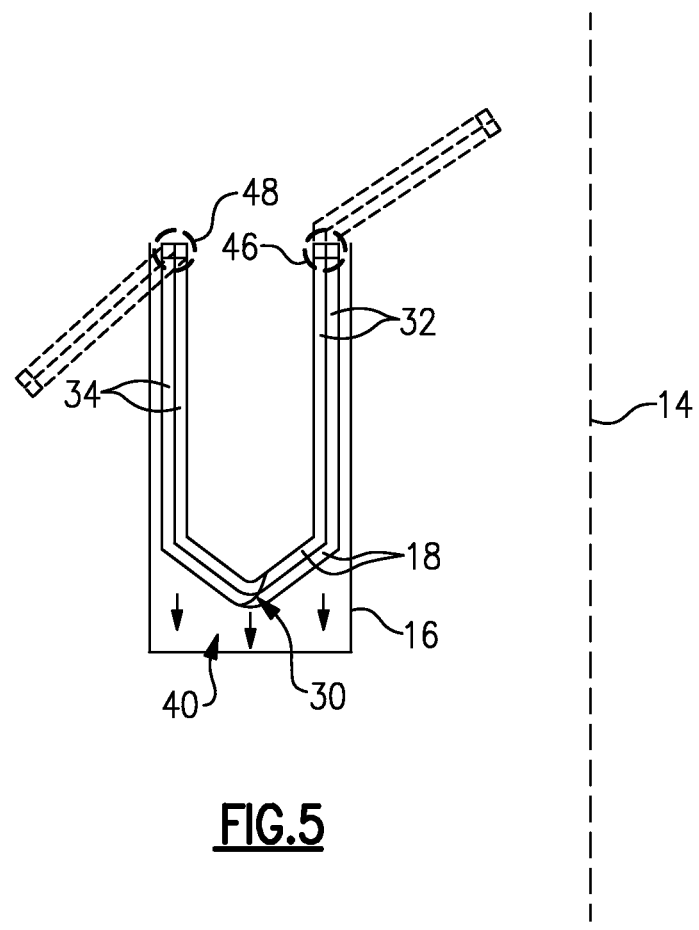
FIG. 5 is a side cross sectional view of a slot with windings of the example stator of FIG. 2.

Referring for FIG. 5, with continued reference to FIGS. 2, 3, and 4, a plurality of windings 18 is at least partially inserted into each of the plurality of slots 16. The plurality of windings 18 is inserted such that the knuckle 30 is inserted first and moves to the bottom end 40 of each slot 16. Both the first portion 32 and the second portion 34 of each winding 18 are located in the same slot 16. The first portion 32 of each winding 18 is positioned at a position radially inward of the second portion 34 relative to the axis 14. Both the first portion 32 and second portion 34 extend out from the bottom end 40 of each slot 16. In one example, two windings 18 are inserted into each slot 16. However, it is within the contemplation of this disclosure for each slot 16 to hold more than two windings 18.

The at least two windings 18 inserted into each slot 16 are aligned such that there is minimal or no space separating the at least two windings 18. Within each of the plurality of slots 16, each first portion 32 of each winding 18 within the same slot 16 is grouped to form an inner group 46, and each second portion 34 of each winding 18 within the same slot is grouped to form an outer group 48.

Figure 6:
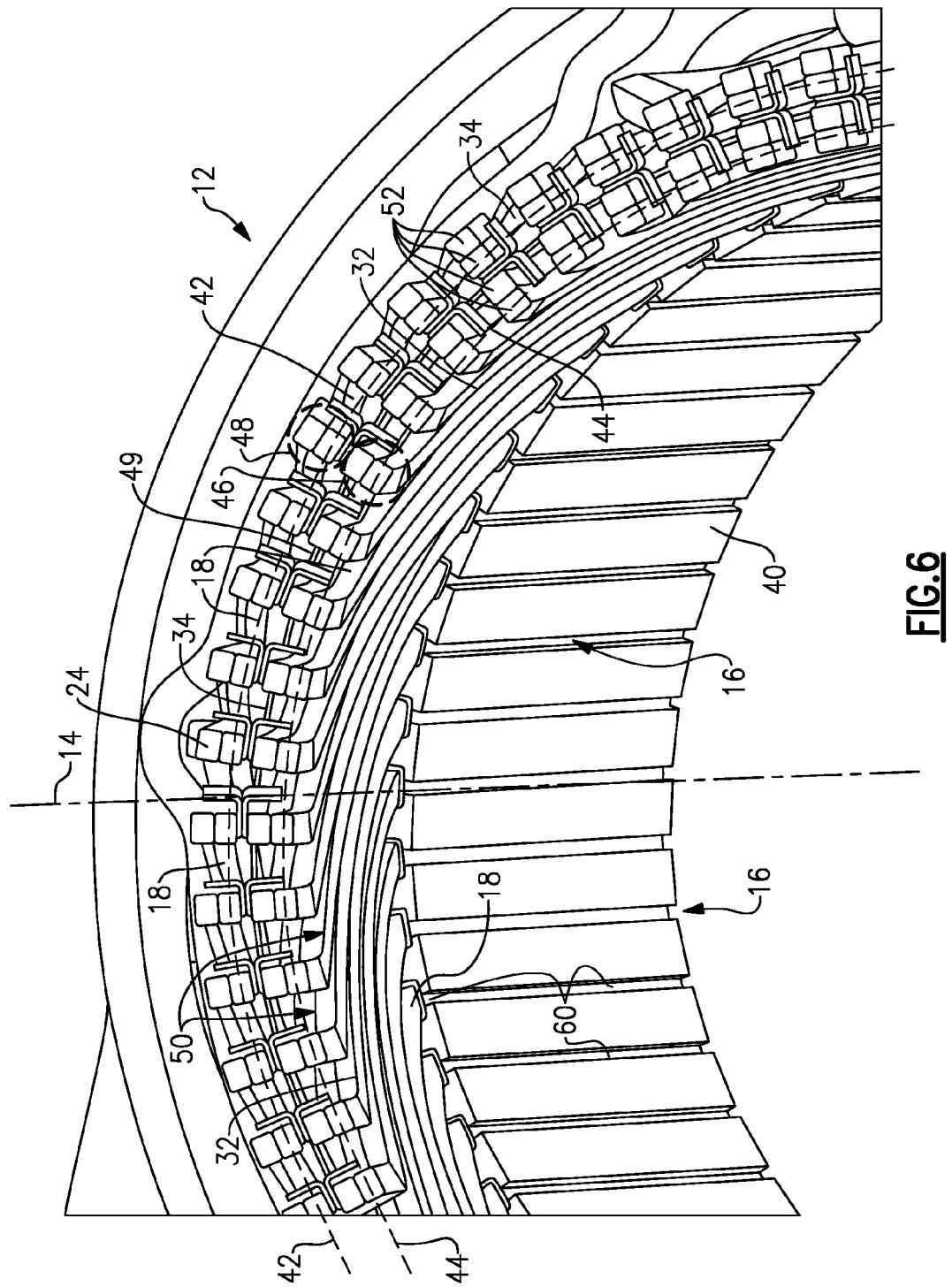
FIG. 6 is a close-up perspective view of a portion of the example stator of FIG. 2.

Referring to FIG. 6, with continued reference to FIGS. 2 and 5, at least a part of the first portion 32 and a part of the second portion 34 extends out beyond the plurality of slots 16. When the plurality of windings 18 are partially inserted into the plurality of slots 16, an inner ring 42 of inner groups 46 and outer ring 44 of outer groups 48 is formed circumferentially around the stator 12.

Each of the plurality of windings 18 are enclosed in a non-conductive insulation 50. However, the insulation 50 is stripped at the ends 52 of the windings 18 not in the slots 16 to expose the ends 52, allowing the windings 18 to electrically contact. Therefore, the exposed ends 52 are configured to allow electrical current to flow through connected windings 18. In addition, a portion of the plurality of windings 18 are surrounded by an slot insulator 60 (discussed in further detail below) within the plurality of slots 16. In one example, the slot insulator 60 is a formed sheet of material that extends partially above the slots 16.

In one example, an insulation sheet 49 is provided between the inner ring 42 and the outer ring 44 to provide further insulation. The insulation sheet 49 is aligned between the inner ring 42 and outer ring 44 outside the plurality of slots 16. As shown, the insulation sheet 49 may extend from the top of the plurality of slots 16 to the exposed ends 52. However, it is within the contemplation of this disclosure to use other alignments and sizes for the insulation sheet 49. The insulation sheet 49 provides extra insulation between the inner ring 42 and outer ring 44 to prevent first portions 32 and second portions 34 disposed at least partially in the same slot 16 from contacting.

Jump connectors 24 are provided at certain points around the stator 12 to provide a way for the electrical current to exit the stator 12. The jump connectors 24 are electrically conductive and are electrically connected to the windings 18 by replacing part of the second portion 34 of one of the windings 18. At locations where jump connectors 24 are needed, the exposed end 52 of a second portion 34 of a winding 18 is removed and the jump connector 24 inserted. The jump connecter 24 is brazed to the remaining second portions 34 of the outer group 48 of second portions 34 it joins. The brazing consists of creating a metallurgical bond between a filler metal and the surfaces of two metals being joined, as known. However, it is within the contemplation of this disclosure to use other methods of joining windings 18 and jump connectors 24. By electrically connecting the jump connector 24 to the remaining second portions 34, the jump connector 24 is able to receive current from a plurality of windings 18 and move the current out of the stator 12 as described above.

Figure 7A:
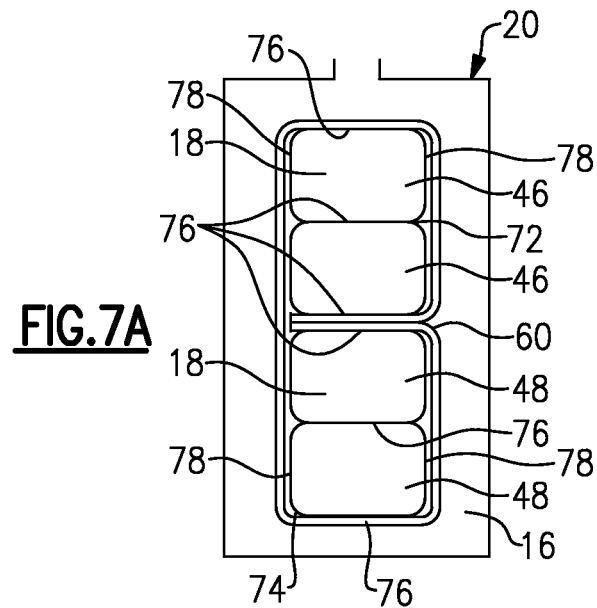
FIG. 7A is a perspective top view of the insulator surrounding the winding groups in an example alignment within the slot.

Referring to FIG. 7A, with continued reference to FIG. 5, the plurality of slots 16 each include an insulator 60 surrounding the plurality of windings 18. The insulator 60 includes a first section 72 surrounding the inner group 46 of windings 18 within each slot 16 and a second section 74 surrounding the outer group 48 of windings 18 within each slot 16. In this example, the windings 18 within each of the inner group 46 and the outer group 48 are aligned such that the longitudinal sides 76, or a long side of the rectangular cross sections of each winding 18, are in contact. In this example, the longitudinal sides 76 are aligned generally parallel to the inner circumference 20 of the stator 12.

The plurality of windings 18 maintain a generally rectangular cross section defined by pairs of opposing sides 76, 78. Each side 76, 78 of a pair are parallel to each other and perpendicular to each side, 78, 76 respectively, of the opposing pair. As shown, the plurality of windings 18 maintain a generally rectangular cross section while having rounded corners connecting the opposing pairs of sides 76, 78. It is within the contemplation of this disclosure for the plurality of windings to maintain a generally rectangular cross section in other arrangements which do not change the alignment of the opposing pairs of side 76, 78.

Figure 7B:
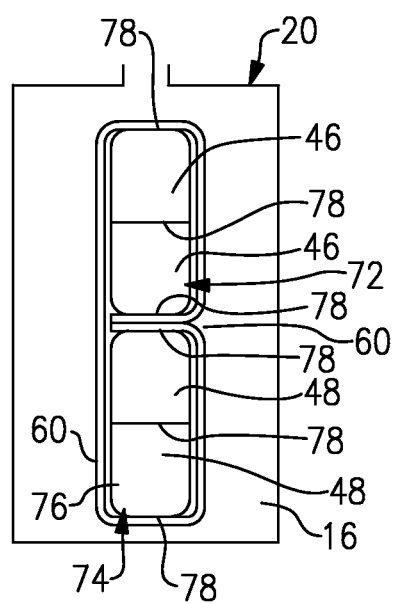
FIG. 7B is a perspective top view of the insulator surrounding the winding groups in another example alignment within the slot.

Referring to FIG. 7B, with continued reference to FIGS. 5 and 7A, the plurality of slots 16 each include an insulator 60 surrounding the plurality of windings 18. The insulator 60 includes a first section 72 surrounding the inner group 46 of windings 18 within each slot 16 and a second section 74 surrounding the outer group 48 of windings 18 within each slot 16. In one example, the windings 18 within each of the inner group 46 and the outer group 48 are aligned such that the non-longitudinal sides 78, or shorter side of the generally rectangular cross section of each winding 18, are in contact. In this example, the non-longitudinal sides 78 are aligned generally parallel to the inner circumference 20 of the stator 12.

Referring to FIG. 8, with continued reference to FIGS. 2 and 4, the portion of the windings 18 located above the plurality of slots 16 are shown. As each winding 18 extends out of the slot 16, the winding is bent in a direction generally aligned with the inner circumference 20 of the stator 12. The first portion 32 of each of the plurality of windings 18 are located radially inward of the second portions 34 of each of the plurality of windings 18. The first portions 32 and second portions 34 are bent in opposing directions to allow non-adjacent first portions 32 and second portions 34 to align. The alignment of non-adjacent first portions 32 and second portions 34 allows for continual current flow through the windings 18 without short circuiting the windings 18.

An inner group 46 and an outer group 48 are formed from the plurality of windings 18 common to the same slot 16. In one example, the inner group 46 is a pair of first portions 32 and the outer group 48 is a pair of second portions 34. However, it is within the contemplation of this disclosure for other numbers of first portions 32 and second portions to comprise the inner groups 46 and outer groups 48. The exposed ends 52 of the inner groups 46 and outer groups 48 are aligned such that each inner group 46 is electrically coupled to an outer group 48 from a non-adjacent slot 16. The aligned inner groups 46 and outer groups 48 are brazed together at the exposed ends 52 to form the electrical coupling.

In one example, a braze clip 62 is used to aide in electrically connecting the inner groups 46 and outer groups 48. The braze clip 62 is made of a conductive material and allows current to flow between the inner group 46 and outer group 48. The braze clip 62 may be an H-clip, as shown. However, it is within the contemplation of this disclosure to use other configurations of clips as needed based on the alignment of the inner groups 46 and outer groups 48. In one example, the braze clip 62 is a copper alloy. The use of the braze clip 62 results in the inner group being electrically and physically clamped to the outer group to allow current flow between windings 18.

In operation, electrical current, generated by the rotation of the rotor 13, flows through the plurality of windings 18 in the stator 12. The windings 18 with generally rectangular cross sections allow for the plurality of windings 18 to fill the plurality of slots more efficiently, filling the slot more completely than other conductors. As a result, the slot 16 size is reduced and the overall weight of the stator 12 is reduced.

AC currents in the winding 18 that flow in the slot produce a time varying magnetic leakage flux. This leakage flux flows through the width of the slot 16. This leakage flux induces an eddy current in the surface of the winding 18, which increases the effective resistance of the winding 18 and resistive losses. The increase in losses to the resistive losses caused by eddy currents is called eddy current losses. The eddy current loss is proportional to the square of the longitudinal side 78 of the winding 18, the square of the frequency of the AC current, and the square of the magnetic flux in the unit. By using multiple conductors the surface that the induced eddy current can travel on is reduced on the longitudinal side 76, thus reducing the total effective resistance. The decrease in effective resistance and eddy current losses also prevents additional heat generation, lowering cooling requirements within the stator 12.

Figure 9:
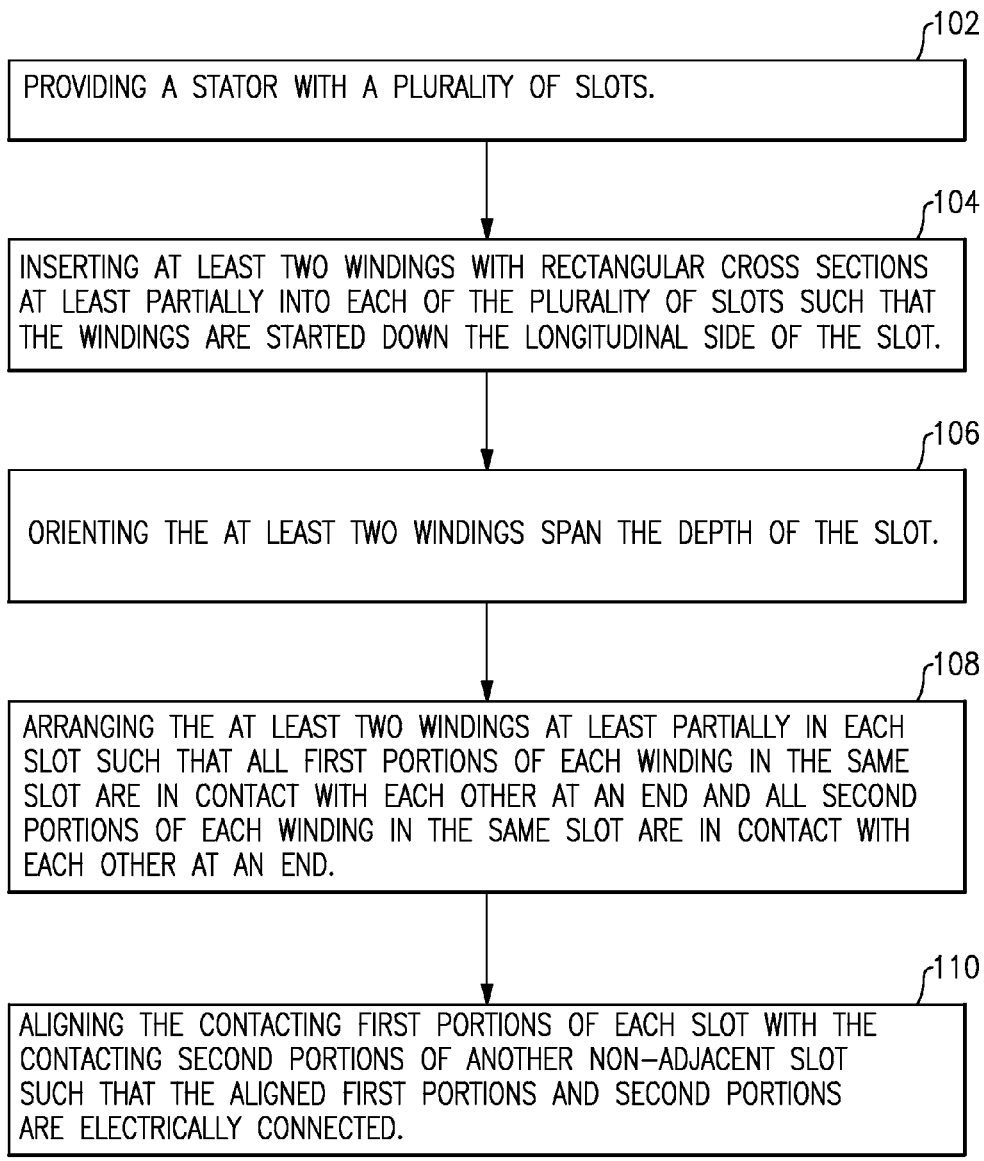
FIG. 9 is an example method for reducing eddy current within a stator.

Referring to FIG. 9, a method for reducing eddy current loss, or effective resistance, within a stator includes providing a stator with a plurality of slots 102. At least two windings 18 with rectangular cross sections are inserted into each of the plurality of slots, such that the windings are stacked down the longitudinal side of the slot 104. The at least two windings are oriented such that the at least two windings span the depth of the slot 106. The at least two windings are at least partially in each slot are arranged such that all first portions of each winding in the same slot are in contact with each other at an end, while all second portions of each winding in the same slot are also in contact with each other at an end 108. The contacting first portions of each slot are aligned with the contacting second portions of another non-adjacent slot such that the aligned first portions and second portions are electrically connected 110.

Although a preferred embodiment has been disclosed, a worker of ordinary skill in this art would recognize that certain modifications would come within the scope of this disclosure. For that reason, the following claims should be studied to determine the true scope and content of this disclosure.

What is claimed is:

1. An electric machine comprising:
   a rotor;
   a stator disposed about an axis and having a plurality of slots parallel to the axis, the stator in register with the rotor; and
   a plurality of windings
      each of said plurality of windings having a generally rectangular cross section,
      a first portion, and
      a second portion, the first portion disposed radially inwardly of the second portion relative to the axis,
   wherein at least two of said plurality of windings are at least partially disposed within each of the plurality of slots, the first portion and the second portion of each of the plurality of windings at least partially disposed within the same slot,
   wherein the plurality of windings in each of the plurality of slots is aligned such that each first portion is in contact with at least one other first portion of the same slot to form an inner group common to each of the plurality of slots and each second portion is in contact with at least one other second portion of the same slot to form an outer group common to each of the plurality of slots, wherein the inner group of each of the plurality of slots is connected to the outer group of another non-adjacent slot, and the plurality of windings in each of the plurality of slots reduces resistive loss within the stator.

2. The electric machine of claim 1, further comprising at least one insulator, each insulator including a first section at least partially surrounding the inner group and a second section surrounding the outer group, the insulator extending the length of the slot and configured to prevent contact between the inner group and the outer group.

3. The electric machine of claim 2, wherein at least one of the first portions of the inner group and the second portions of the outer group are aligned such that a longitudinal side of the portions within a group are contacting, the longitudinal side generally parallel to an inner circumference of the stator.

4. The electric machine of claim 2, wherein at least one of the first portions of the inner group and the second portions of the outer group are aligned such that a non-longitudinal side of the portions within a group are contacting, the non-longitudinal side generally aligned with an inner circumference of the stator.

5. The electric machine of claim 1, wherein the electric machine is configured for a gas turbine engine.

6. The electric machine of claim 1, wherein the inner group of each of the plurality of slots are electrically connected to the outer group of another non-adjacent slot at exposed ends.

7. The electric machine of claim 6, wherein a jump connector replaces the exposed end of a second portion in at least one outer group.

8. The electric machine of claim 6, wherein the inner group is electrically and physically clamped to the outer group.

9. The electric machine of claim 8, wherein the inner group is in contact with the outer group by brazing.

10. The electric machine of claim 6, wherein a clip is in contact with both the inner group and the outer group, the clip configured to provide an electrical connection between the inner group and the outer group.

11. The electric machine of claim 6, wherein three pairs of jump connectors are provided, each jump connector replaces the exposed end of a second portion in at least one outer group.

12. The electric machine of claim 11, wherein each jump connector of a pair of the three pairs is 180 degrees apart.

13. The electric machine of claim 11, wherein each jump connector of a pair of the three pairs is 120 degrees apart.

14. The electric machine of claim 1, wherein each of the plurality of windings is enclosed in a non-conductive insulation.

15. The electric machine of claim 14, wherein an insulation ring is disposed between the inner group and the outer group.

16. The electric machine of claim 1, wherein each of the plurality of windings includes a knuckle disposed in one of the plurality of slots.

17. The electric machine of claim 1, wherein each of the plurality of windings is enclosed in a non-conductive insulation independent of the at least one insulator.

18. An electric machine comprising:
a rotor;
a stator disposed about an axis and having a plurality of slots parallel to the axis, the stator in register with the rotor; and
a plurality of windings
each of said plurality of windings having a generally rectangular cross section,
a first portion, and
a second portion, the first portion disposed radially inwardly of the second portion relative to the axis,
wherein at least two of said plurality of windings are at least partially disposed within each of the plurality of slots,
wherein the plurality of windings in each of the plurality of slots is aligned such that each portion is in contact with at least one other first portion of the same slot to form an inner group common to each of the plurality of slots and each second portion is in contact with at least one other second portion of the same slot to form an outer group common to each of the plurality of slots,
wherein the inner group in each of the plurality of slots is connected to the outer group in another non-adjacent slot, and the plurality of windings in each of the plurality of slots reduces resistive loss within the stator, wherein each of at least one insulator includes a first section at least partially surrounding the inner group and a second section surrounding the outer group, the insulator extending the length of the slot and configured to prevent contact between the inner group and the outer group, wherein each of the plurality of windings includes a knuckle disposed in one of the plurality of slots.

* * * * *